United States Patent [19]
Wiklund et al.

[11] 3,985,448
[45] Oct. 12, 1976

[54] ANGLE OR LENGTH MEASURING DEVICE

[75] Inventors: Klas Rudolf Wiklund, Taby; Nils Gunnar Bernhard, Lidingo; Harald Kleinhuber, Mariefred, all of Sweden

[73] Assignee: AGA Aktiebolag, Lidingo, Sweden

[22] Filed: Jan. 8, 1975

[21] Appl. No.: 539,321

[30] Foreign Application Priority Data
Jan. 15, 1974  Sweden .............................. 7400508

[52] U.S. Cl. .................... 356/169; 250/231 SE; 250/232; 250/236; 250/237 G; 356/170
[51] Int. Cl.² ...................... G01B 11/14; G01D 5/36
[58] Field of Search .......... 250/229, 231 SE, 231 R, 250/232, 233, 236, 237 G; 356/169, 170

[56] References Cited
UNITED STATES PATENTS

| | | | |
|---|---|---|---|
| 3,162,711 | 12/1964 | Pegis | 250/237 G X |
| 3,166,624 | 1/1965 | Vargady | 250/237 G X |
| 3,187,187 | 6/1965 | Wingate | 250/233 |
| 3,244,895 | 4/1966 | Anderegg, Jr. | 250/236 |

*Primary Examiner*—Eugene La Roche
*Attorney, Agent, or Firm*—Lerner, David, Littenberg & Samuel

[57] ABSTRACT

A measuring device is disclosed which can measure an angle or length and which employs either an angle or length measuring plate. The angle or length measuring plate has thereon at least one measuring scale which has a regular pattern along the majority of the lengths thereof and an irregular pattern on two portions thereof. A light beam shines through an optical system to pass through the measuring scale at two points and from there into a photo-detector. The light path is arranged to pass through the two irregular portions at the same time. Several embodiments of the irregular patterns are shown. A circuit is also shown to detect the irregular portions and employ it as a reference signal.

5 Claims, 10 Drawing Figures

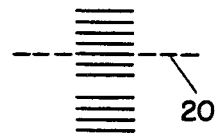
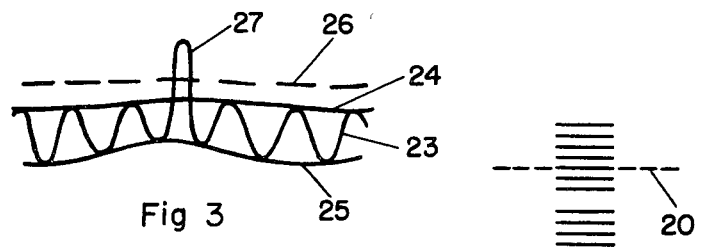
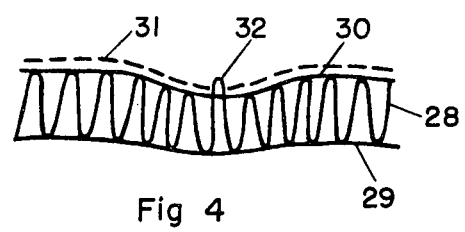
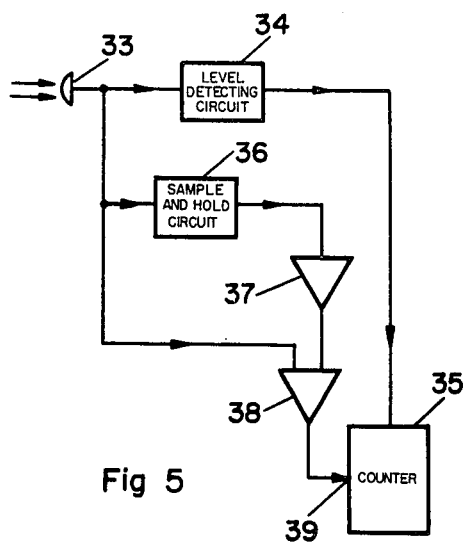
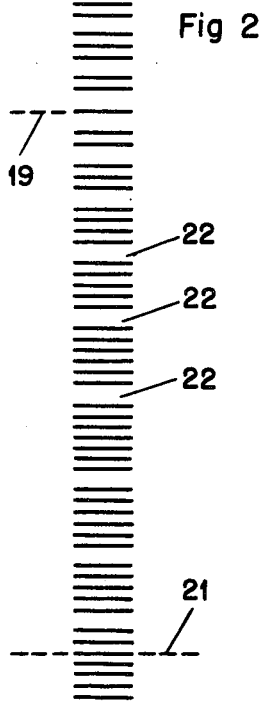

ANGLE OR LENGTH MEASURING DEVICE

FIELD OF THE INVENTION

The present invention relates to improvements in an angle or length measuring device containing an angle or length measuring plate provided with one or more measurement scales.

BACKGROUND OF THE INVENTION

Devices exist which include a measuring plate which has measurement scales on first portions of the measuring plate which are projected onto and through the measurement scales on second portions of the measuring plate, or a pattern on a fixed screen is projected onto and through the second portions of the measurement scales on the measuring plate, and then onto a photo-detector allotted to each measurement scale to create electric measurement signals varying according to the movements of the measuring plate. Electric circuits are provided to interpret the measurement signals.

With measuring devices such as the one described above, it is often desirable to obtain a reference indication when the measuring plate occupies a particular position. According to German Pat. No. 1,814,785, it is known to install a special reference scale on a measuring plate which is scanned with a separate photo-detector to obtain a reference signal which is separate from the electric measurement signals.

Therefore, in order to obtain a reference signal in presently available systems, there is a need for both a separate photo-detector and a special reference scale on the measuring plate. Since a separate photo-detector and associated circuit is used shifts can occur in the reference signal due to temperature changes and aging of parts. This invention is chiefly characterized by the fact that such separate photo-detector and scale is unnecessary. Thus the device of this invention is simpler and cheaper than the systems at present available, while angle or length measuring devices without reference possibilities can easily be supplemented to include such adjustments. In this way an existing measurement scale can be easily supplemented with the help of modern masking methods so as to have qualities similar to those of the measurement scales to be described later, and that the existing electronic circuits can easily be connected to additional circuits for reference signal notations. In addition, displacements between reference signals and measurement signals caused, for example, by temperature changes or worn-out parts can be largely eliminated by means of the present invention.

BRIEF DESCRIPTION OF THE INVENTION

In order to overcome the disadvantages of the prior art, a measuring device is provided which includes a measuring plate mounted for movement past a point which has a measuring scale thereon for providing a regular optical pattern along a first portion thereof and an irregular optical pattern along a second portion thereof. A photo-detector mounted at the point is employed for detecting light from said measuring scale to provide an electric signal. Circuitry is provided which is responsive to the electric signal for providing a reference signal in response to said electric signal which results from the second portion of the measuring signal.

In the preferred embodiment of the invention, the measuring scale has a third portion thereof which has an irregular optical pattern thereon and a light detected by the photo-detector passes through the measuring scale at two points which include the second portion when it includes the third portion.

DESCRIPTION OF THE DRAWINGS

For a more complete understanding of the invention, reference should be made to the following detailed description and drawings in which FIG. 2 shows examples of a pattern for a measurement scale according to the invention, FIGS. 3 and 4 show two signal diagrams, FIG. 5 shows an embodiment of a block schedule for circuits for the evaluation of the reference signal according to the invention.

DETAILED DESCRIPTION OF THE INVENTION

Figure 1:
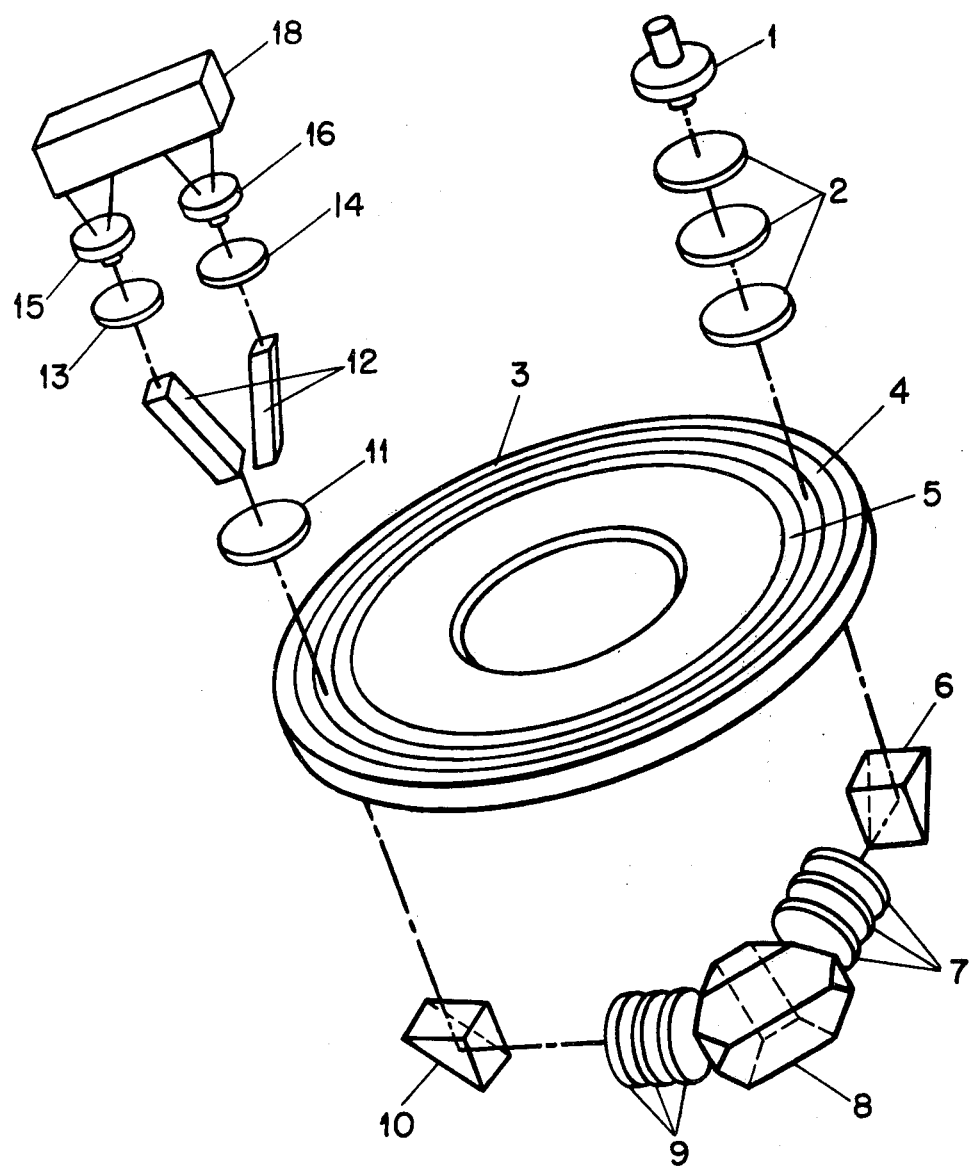
FIG. 1 shows an example of a current angle measuring system, previously described, for example, in Swedish Pat. No. 355,667.

The prior art angle measuring system in FIG. 1 includes a light emitting diode 1 and a condenser 2. A circular angle measuring disc 3 is provided with two measurement scales 4 and 5. These measurement scales are composed of alternating transparent and non-transparent fields. The light from the light emitting diode passes through the condenser and is then modulated by the regular transparent and non-transparent fields in the respective scales 4 and 5 during the transmission of the light through the rotating disc. From there the light is transferred to a diametrically opposite point on the disc 3 by means of the angular prisms 6 and 10, the lens system 7 and 9, and the Amici prism 8. The light is again made to penetrate the angle measuring disc 3 in the two measurement scales 4 and 5.

The light further passes through a lens 11 for focusing and then an optical device 12 for beam separation. In the latter optical device the light from the two adjacent measurement scales 4 and 5 are separated so that each resulting beam can be easily detected by the relatively larger photo-detectors 15 and 16. The lenses 13 and 14 used for focusing are fitted between the optical means 12 used for beam separation and the photo-detectors 15 and 16.

The signals that appear on the outputs of the two photo-detectors 15 and 16 will vary according to the rotation of the angle measuring disc. These measurement signals are fed to an electric circuit 18 which evaluates the measurement signals and, for example, digitally records the rotation of the angle measuring disc, e.g., in degrees. The device shown in the diagram is thus fitted with two measurement scales for supplying information concerning the direction of motion of the measuring disc. The patterns on these discs are arranged so that the signals from the photo-detectors are displaced, in relation to each other, by one-fourth of a period. By means of these phase positions, the direction of motion of the plate can be determined. However, it should be pointed out at this point that the invention in question can be used in any of the well-known angle and length measuring devices equipped with only one scale.

In some of the following figures a number of examples will show details of different embodiments of the measurement scales, which include irregularities giving rise to a reference signal in a certain position of the measuring disc. Among these embodiments there are two basic ways in which the irregularities are incorporated into the regular pattern which is presently used in incremental angle or length measuring systems.

In the first method, changes are incorporated into the regular pattern so that irregularities take place in it. In the second method, in connection with and beside the regular pattern, an irregular pattern is inserted with which a light source is used, so that the regular measurement scale and the irregularities are detected by the same detector device. Thus, apart from the ordinary signal from the regular pattern, the signal from the detector device will also contain a significant change as a result of the previously mentioned irregularities.

As has been described in the Background of the Invention, part of the measuring plate is projected by means of incremental measuring systems onto another part of the measuring plate, or a fixed screen is projected onto the pattern on the measuring plate. In order to obtain a reference pulse according to the invention, two sets of irregularities in or beside the pattern are necessary. In the case where part of the measuring plate is projected onto another part of the plate, these irregularities are to be placed in or beside the pattern so that they can be projected onto each other. In the case where a fixed screen is used, one of the sets of irregularities must be on this screen. Perhaps the best solution is to use the device according to the invention in connection with such incremental measuring systems which project part of the measuring plate onto another part of the plate, since when employing a fixed screen, the irregularities are always in front of the detector and thus the ground signal becomes somewhat affected over the whole measuring area. The ordinary measuring signal is not as distinct as if the irregularities were not present. It can also be mentioned here that in certain systems, such milder distortions in the ground signal are quite acceptable. If several reference signals are needed for different positions of the measuring plate, several sets of irregular patterns can be arranged on the measuring plate. In the case where a fixed screen is used, the number of irregular pattern parts in the system become fewer than if part of a measurement scale is projected onto another part.

The pattern of a set of irregularities mentioned above is shown in FIG. 2. This pattern could well be assigned to the fixed screen and to part of the measuring plate which is used in connection with a similar fixed screen. However, even the pattern can be one of the two sets of irregularities which are used in such systems where a part of the measuring plate is projected onto another part of the plate. In the figure the pattern is straight and can thus be related to a length measuring plate. The pattern in a system according to FIG. 1, if one imagines it straightened, can look like the pattern in FIG. 2. Here the set of irregularities shown in FIG. 2 must be on two diametrically opposite parts of the disc. It must be mentioned here that in this case the reference signals are obtained twice for each effective turn of the measuring disc. In FIG. 2, a broken line is marked 19 and shows a symmetry axis around which the irregularities in the pattern are built up. In order to gain maximum effectivity, the line 19 in the two sets of irregularities must be diametrically in the disc. In the incremental measuring systems, the detector detects a certain part of the measuring disc at a certain moment. In the pattern shown in FIG. 2, the detector sees the part of the pattern between the lines 20 and 21, which, if the pattern is regular, is comprised of 100 dark fields and 100 transparent fields. This part between the lines 20 and 21 in a system may well comprise one-fiftieth of the complete circumference of the measuring disc.

In order to obtain the largest difference in the reference pulse in comparison with the ordinary signals obtained in the system, a large part of the detector's coverage area between the lines 20 and 21 must be used for the irregular pattern. However, in certain systems it is sufficient to take advantage of a lesser part of the detector's coverage area, and thus the irregular pattern should be concentrated around the symmetry line 19, since the transmitting optic is best made use of in this way.

In this embodiment, the irregularities in the pattern have been formed since certain dark fields in the regular pattern have been removed, and thus the intervals 22 obtained. As has been previously mentioned, these intervals are symmetrically situated in relation to line 19 in the figure. The pattern shown in the figure is only one example of how one can arrive at a reference pulse which becomes relatively strongly marked in relation to the signals from the regular pattern. This symmetry in the pattern is unnecessary. It is often preferable to create the irregular pattern in a somewhat unsymmetrical way.

The ideal thing would be if the output signal from the detector was completely regular and unaffected by the irregularities except in one certain position in the measuring plate when a very strong pulse occurs. However, one can carry out adjustments, and in order to obtain a relatively strong pulse in any one position in the measuring plate, one is even obliged to accept that a number of less distinct, but in relation to the ordinary measurement signal, unusual pulses will be given off near the reference pulse. As shown in the pattern, the number of wide intervals in front of the detector in the position where the reference pulse is given off, will be eighteen. However, when non-transparent parts of the irregular pattern are in front of the detector in different positions 1–6, wide intervals in certain other positions will be visible to the detector. The difference between 6 and 18 intervals is so large that the increase light intensity is completely sufficient for the correct position with 18 intervals to be detected in a secure way. The position of the reference pulse gives an approximately 20 percent higher lighting on the detector than in the positions on the measuring disc when only the regular pattern is situated within the detection area.

FIG. 3 shows roughly what the signal from a detector in a measuring system of the type described in connection with FIGS. 1 and 2 looks like. The curve 23 on the left and right of the figure shows the regular signal which occurs as a result of the regular pattern on the measuring plate. The lines 24 and 25 denote the envelopes of the curve 23.

When the irregularities in the pattern start coming into the detector's detection area, the average value of the signal 23 becomes somewhat changed towards a higher value since the light penetration through the pattern slowly increases near the position on the measuring plate when the reference pulse is given.

As has been described earlier in connection with FIG. 2, the signal from the detector will in a certain position become considerably stronger than the normal values. This is indicated by the top 27 of the curve 23.

The reference level 26 is also shown in the figure and will be explained in connection with FIG. 5.

FIG. 4 shows the signal from a detector in a measuring device according to the invention where, as a contrast to what has been previously described, irregularities have been obtained by increasing the number of non-transparent fields on certain parts of the measuring disc. The lower and upper envelopes 29 and 30 have been drawn in the figure to the signal 28 emanating from a photo-detector. When the irregularities in the pattern start entering the detector's detection area, the average value of the signal 28 changes to a lower value since the light penetration through the pattern slowly decreases near the position on the measuring plate when the reference pulse is given. The reference impulse 32 is distinguished by the fact that it has a higher amplitude than its adjacent pulses since when the measuring plate is in the reference position, the number of transparent fields will again increase considerably. The level 31 included in the figure has chiefly the same function as the level 26 in FIG. 3 and will be explained in connection with one of the following figures.

FIG. 5 shows a block plan of a device according to the invention included in an incremental measuring system which, to make things more easy, is a type which only uses one measuring channel. Even in the systems using two measuring channels to define the direction of the movement to be measured, the reference signal is often only necessary from one channel. In this case, the other channel is not used in any way to affect the invention. Number 33 in the figure is a detector. This is connected to a level detecting circuit 34 for distinguishing signals from noise. From this circuit 34, signals are conveyed further in the form of pulses to a periodically reset counter 35 which thereby calculates, according to a previously decided measure, the desired movement. In this embodiment the reference signal is used to reset the counter 35 to zero in a certain position of the measuring plate at which it is possible to record the given value of the counter to a certain angle concerning angle measurement, or a certain point during length measurement.

The signal which is fed into the level detecting circuit 34 is the signal 23 in FIG. 3 or 28 in FIG. 4, depending upon the type of irregularities used.

For the sake of simplicity, the device in FIG. 5 will be described in connection with the embodiment in FIG. 2, which creates the signals in FIG. 3. The counter 35 will step forward at each top of the signal 23, and also the top 27 will cause a step operation which does not differ from the other step operations. On the other hand, the devices 36, 37 and 38 are used to evaluate the pulse top 27, and this in turn sets the counter 35 at zero.

The signal 23 in FIG. 3 is not only fed from the detector 33 to the circuit 34, but also to a sample and hold circuit 36, and to one input of a comparator 38. The circuit 36 causes the top amplitude 24 of the signal 23 to be memorized and fed into an amplifier 37 which has positive amplification. The amplifier 37 causes the signal to lie on the level 26 in FIG. 3. This signal 26 will have a value that exceeds the top amplitude 24 of the signal 23, but which is below the top 27 of the signal 23 in FIG. 3. The circuit 36 could either detect the peak amplitude of the pulse 27 and provide the level 26 with the aid of amplifier 37 having a gain of less than one or detect the average amplitude of the signal 23 and having the amplifier 37 have a gain of more than one. This concerns all cases, whatever the temperature and voltage variations in the measuring device. The level 26 coming from the amplifier 37 thus always exceeds the normal top amplitude of the signal 23 while at the same time falling short of the top 27 in the reference pulse. The amplifier 37 is connected to the second input of the comparator 38. At the output of the comparator 38, a pulse only appears if the input signal of the comparator coming directly from the detector 33 in amplitude value exceeds the value of the second input.

A pulse on the output of the comparator 38 will be given when the reference pulse is received by the detector, i.e., in the reference position of the measuring plate. In this embodiment, the pulse is used to set to zero the counter 35.

Instead of using an amplifier 37 to gain the level 26 in FIG. 3, a fixed voltage can be added to the envelope 24 with a value sufficient to fulfill the named criteria for the level 26 in FIG. 3. In certain cases it could even be possible to replace the blocks 36 and 37 with a voltage source giving a fixed or in some way varying voltage.

Descriptions have so far covered embodiments according to the invention, where the irregularities used to obtain reference signals have been included in the usual measurement scale. However, embodiments of the device according to the invention are possible where the irregularities already mentioned are arranged beside the ordinary measurement scale, but detected by the same detector as for the measurement scale. No special detector with optics is necessary for the detection of the reference signal.

FIGS. 6–9 show four different examples of a pattern used to obtain reference signals. The information given in connection with the pattern in FIG. 2 is basically valid for these patterns as well. The ordinary pattern in the measurement scale in FIG. 6 has the number 40. On either side of the measurement scale 40, the irregularities 41 are arranged. In order to obtain a signal similar to the one in FIG. 3 and with a pattern as in FIG. 6, the pattern mentioned in the figure will be seen as negative to the actual pattern. This is the most practical creation of this type of pattern since the parts around the pattern 40 are covered with a non-transparent layer, and the lines 41 are transparent. In this way, the basic level of the lighting is kept down, and the difference in lighting when the reference point occurs thus becomes more noticeable.

The best form for the pattern even in the following figures is if the dark lines are taken as negative, in other words, actually transparent.

Figure 6:
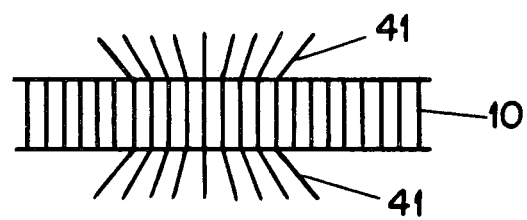
FIGS. 6–10 show further embodiments of measurement scale patterns.
Figure 7:
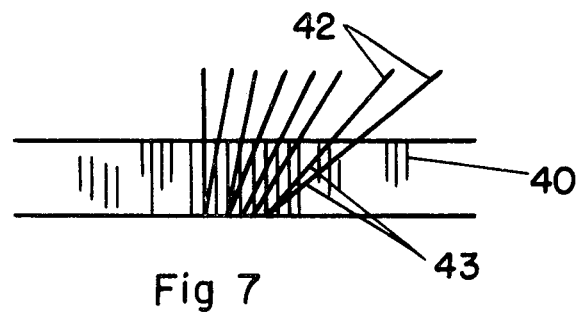

FIG. 6 has the original pattern 40 completely intact, while patterns for the reference signal have been placed on either side. In FIG. 7, another pattern 43 is inserted (superimposed) on the ordinary pattern 40, which furthermore stretches outside the original pattern, on one or both sides of it, to a part 42.

Figure 8:
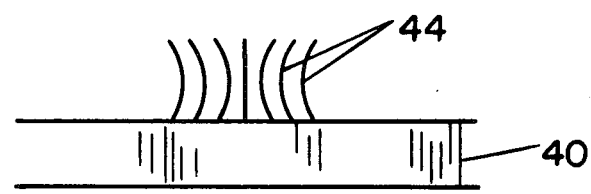

FIG. 8 shows another example of the pattern to attain reference signals in which the pattern 44 lies outside the ordinary pattern 40.

Figure 9:
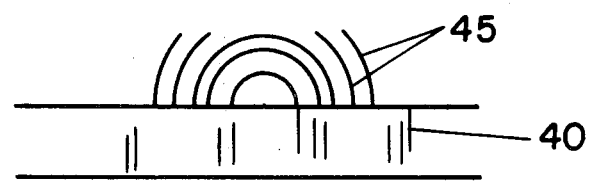

FIG. 9 shows an example for a pattern 45 to attain reference signals.

Figure 10:

FIG. 10 shows a pattern form where the original pattern has been superimposed with another pattern 46 to attain a reference signal. In this example, no part outside the original pattern 40 is used.

All the examples of the patterns shown above must occur in two places on the measuring plate and which are projected simultaneously onto each other, or in one place on the measuring plate and on a fixed screen belonging to it. The greatest degree of efficiency is obtained if the patterns are formed in such a way in relation to each other that they exactly cover each other in a certain specific position of the measuring plate.

It may in certain cases be desirable to obtain reference pulses when the measuring plate is not in a specific position. Here patterns are inserted to attain reference signals in several places on the plate. In such cases where several measurement scales are employed, irregularities in the form of patterns similar to those described above can be inserted in one or both scales. Thus both scales can be used to obtain several reference pulses, but patterns can also be inserted so that reference pulses are obtained in both scales simultaneously, ensuring extra security.

It can be easily understood that the ordinary signal is least disturbed if the pattern for reference signals is inserted outside the ordinary pattern. However, from the point of view of performance, it is often better to superimpose the two patterns on each other, and in most cases the ordinary signal is disturbed to such a small degree that it does not affect the measuring device in any serious way.

The shown patterns are only to be taken as examples. Many other combinations and forms for the pattern can be employed. For example, one type of pattern for reference signals can lie adjacent to the ordinary pattern, while simultaneously another type of pattern can be superimposed onto the ordinary pattern. Furthermore, one type of pattern can lie on one side of the ordinary pattern, and another type on the other side.

Within the scope of this invention is the possibility of using patterns formed in such a way that the general light level on the detector is lowered immediately before the reference signal occurs, and is again lowered greatly when this occurs at a particular moment. Or that the level is raised before the reference signal occurs, and is greatly lowered when this occurs.

Although this invention has been described with respect to its preferred embodiments, it should be understood that many variations and modifications will now be obvious to those skilled in the art, and it is preferred, therefore, that the scope of the invention be limited, not by the specific disclosure herein but only by the appended claims.

What is claimed is:

1. A measuring device including:
   a measuring plate mounted for movement past a point having a measuring scale thereon, said scale being comprised of a regular optical pattern and a first irregular optical pattern;
   a photo-detector mounted at said point for detecting light from said measuring scale to provide an electric signal;
   first means responsive to said electric signal for providing a reference signal in response to said electric signal resulting from said first irregular optical pattern; and
   second means responsive to said electric signal for providing a measuring signal in response to said electric signal resulting from said regular optical pattern.

2. The measuring device as defined in claim 1 in which the irregular pattern is comprised of said regular pattern with additional fields inserted.

3. The measuring device as defined in claim 1 in which the irregular pattern is comprised of said regular pattern with fields removed.

4. The measuring device as defined in claim 1 in which said measuring scale has a second irregular optical pattern thereon and light detected by said photo-detector passes through said measuring scale at two points which includes said second irregular optical pattern when it includes said first irregular optical pattern.

5. A measuring device as defined in claim 4 in which said first and second irregular optical patterns are the same.

* * * * *